United States Patent [19]

Pancotti et al.

[11] Patent Number: 4,512,717
[45] Date of Patent: Apr. 23, 1985

[54] HELICOPTER ROTOR

[75] Inventors: Santino Pancotti, Gallarate; Renato Mariani, Samarate, both of Italy

[73] Assignee: Costruzioni Aeronautiche Giovanni Agusta S.p.A., Italy

[21] Appl. No.: 588,453

[22] Filed: Mar. 12, 1984

[30] Foreign Application Priority Data

Mar. 15, 1983 [IT] Italy ............................... 67285 A/83

[51] Int. Cl.³ ....................... B64C 11/06; B64C 27/38
[52] U.S. Cl. .................. 416/134 A; 416/138; 416/141; 416/244 R
[58] Field of Search ............... 416/134 A, 138 A, 141, 416/230 A, 140 A, 140 R, 244 D

[56] References Cited

U.S. PATENT DOCUMENTS

| | | | |
|---|---|---|---|
| 4,195,967 | 4/1980 | Weiland | 416/230 A X |
| 4,257,738 | 3/1981 | Schwarz | 416/134 A |
| 4,297,078 | 10/1981 | Martin | 416/140 A X |
| 4,304,525 | 12/1981 | Mouille | 416/134 A |
| 4,321,013 | 3/1982 | Schwarz et al. | 416/244 R |
| 4,342,540 | 8/1982 | Lovera et al. | 416/141 X |
| 4,352,632 | 10/1982 | Schwarz et al. | 416/134 A |
| 4,361,415 | 11/1982 | Aubry | 416/134 A |
| 4,369,019 | 1/1983 | Lovera et al. | 416/134 A |
| 4,407,633 | 10/1983 | Mouille | 416/141 |
| 4,425,082 | 1/1984 | Mussi et al. | 416/230 A X |

FOREIGN PATENT DOCUMENTS

| | | | |
|---|---|---|---|
| 2919040 | 11/1980 | Fed. Rep. of Germany | 416/DIG. 13 |
| 3021280 | 12/1981 | Fed. Rep. of Germany | 416/204 R |
| 2116505 | 9/1983 | United Kingdom | 416/134 A |
| 2116506 | 9/1983 | United Kingdom | 416/140 |
| 2116507 | 9/1983 | United Kingdom | 416/134 A |

*Primary Examiner*—Everette A. Powell, Jr.
*Attorney, Agent, or Firm*—Kane, Dalsimer, Kane, Sullivan and Kurucz

[57] ABSTRACT

FH (FLEX-HUB) helicopter rotor on which each blade is connected to a center hub by a fork having two arms on one side for connection to the relative blade and integral, on the other, to a rod connected to the hub by an elastomer support; the forks being interconnected by a polygonal ring passing between the said arms on each fork and each side of the said ring being supported centrally by a flexible arm extending radially from the hub.

5 Claims, 3 Drawing Figures

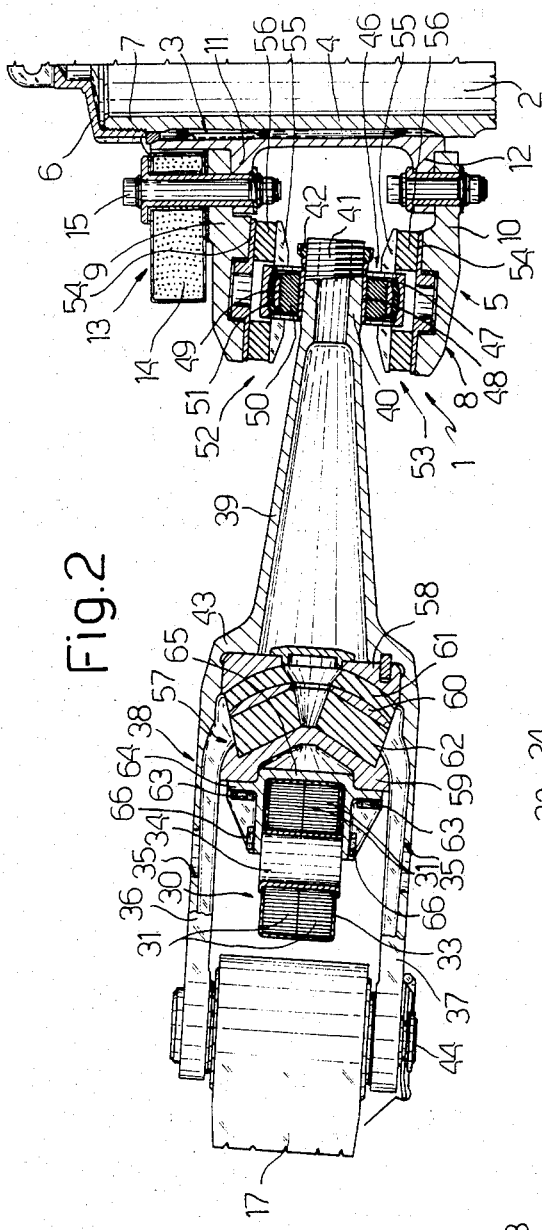
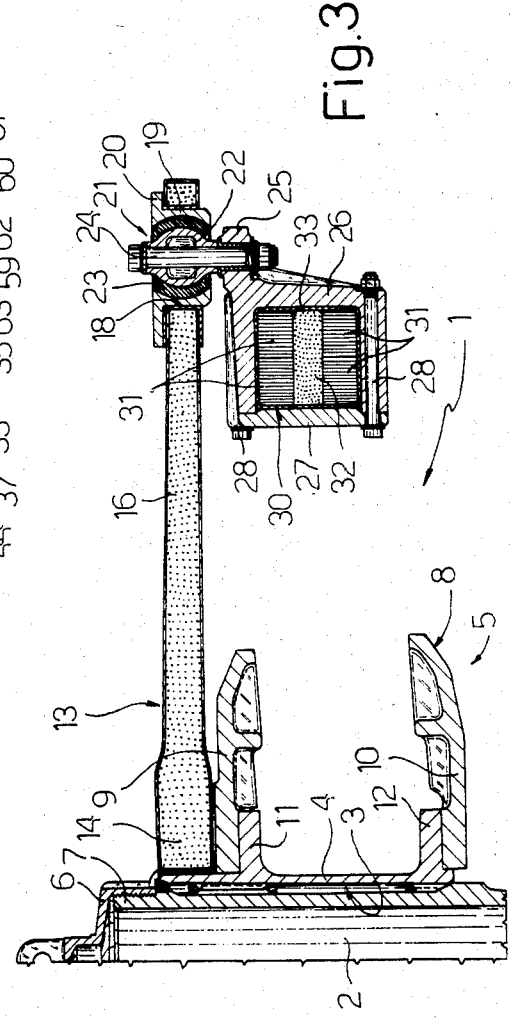

HELICOPTER ROTOR

BACKGROUND OF THE INVENTION

The present invention relates to a helicopter rotor, in particular, an FH (FLEX-HUB) rotor.

Of the abovementioned types of rotor, one is known on which the foot of each blade is clamped between the arms of an essentially U-shaped coupling fork extending essentially radially outwards from a center hub. The said hub essentially consists of a metal plate, usually made of titanium, comprising a center portion from which flat flexible arms, each with a center aperture, extend radially outwards. The said aperture is engaged by the relative fork the closed inner part of which, facing the said hub, is provided with a rod connected to the center portion of the said plate by means of an elastomer ball support. A further elastomer support is inserted to connect each fork to the relative flexible arm portion which closes outwardly the said aperture on the arm so as to form a bridge extending between the arms on the relative fork and in the space between the foot of the relative blade and the inner end of the fork.

On the FH rotor just described, the said flat plate and, in particular, each of the flexible radial pieces on it are subjected, in use, to both centrifugal load and lift bending moments. The said flat plate is therefore forced to operate under severe working conditions in that, when in use, it is subjected not only to tensile stress due to centrifugal force but also to continual bending stress in directions varying continually in cycles. In use, the plate is therefore subjected to severe fatigue load which may soon cause it to collapse if it is not made perfectly using extremely high-cost engineering methods. In addition to the aforementioned manufacturing problems, the said plate also involves a number of design difficulties posed by the need for a fine compromise between a high degree of elasticity on the plate in the air and the rigidity required on the ground to withstand the static loads transmitted by the blades.

SUMMARY OF THE INVENTION

The aim of the present invention is to perfect the above-mentioned FH rotor by providing one on which the said plate is subjected to lighter working conditions. A further aim of the present invention is to provide an FH rotor capable of operating with a plate of relatively low flexibility.

With these aims in view, the present invention relates to a helicopter rotor comprising a center hub, designed to fit on to a center drive shaft, a number of blades extending outwards from the said hub, each said blade being connected to the said hub by connecting means designed to enable the blade to oscillate in the plane parallel to the said drive shaft, in the plane perpendicular to the said drive shaft, as well as around its own axis; the said connecting means comprising, for each blade, a fork extending outwards essentially radially from the said hub and connected to it by first elastomer supporting means; the said fork having two arms facing outwards and connected to the connecting end of the relative blade; characterised by the fact that the said connecting means also comprise an annular component extending round the said hub and through the said forks and connected to each of the latter by second elastomer supporting means; the said hub comprising an essentially star-shaped plate with a number of radial arms and connecting means being mounted between each said arm and a respective point on the said annular component lying halfway between two adjacent said second elastomer supporting means.

BRIEF DESCRIPTION OF THE DRAWINGS

Further aims and advantages of the present invention will now be described, by way of a non-limiting example, with reference to the attached drawings in which:

FIG. 2 shows a cross section along line II—II in FIG. 1;

FIG. 3 shows a cross section along line III—III in FIG. 1.

DETAILED DESCRIPTION OF THE INVENTION

Figure 1:
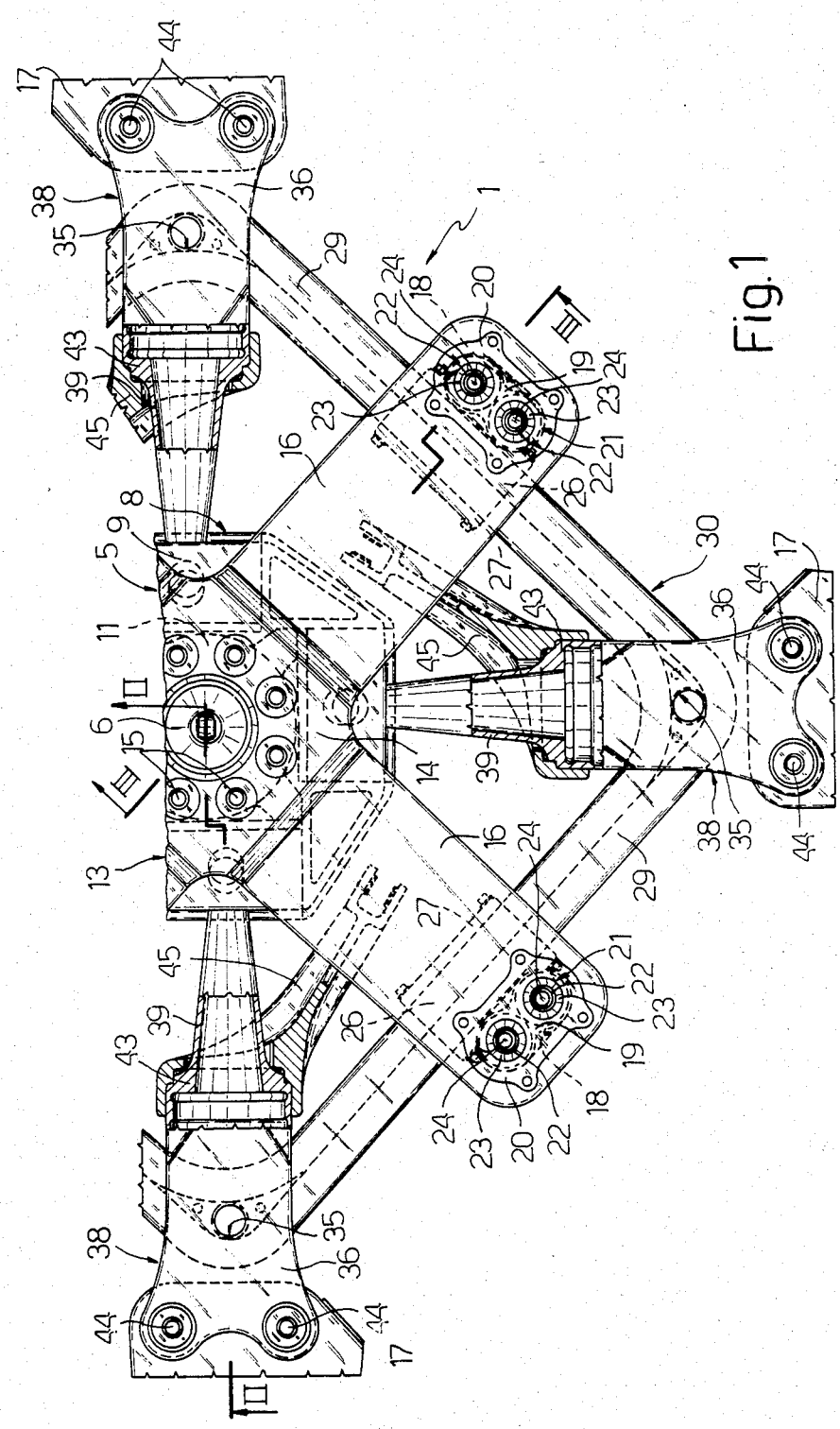
FIG. 1 shows a partial plan view of a helicopter rotor according to the present invention.

In the above diagrams, number 1 indicates a helicopter rotor comprising a center shaft (2) a top portion of which is connected by splined joint 3 to the inner surface of center sleeve 4 on hub 5 which is positioned axially on shaft 2 by cup-shaped ring nut 6 screwed on to the threaded top end (7) of shaft 2.

Hub 5 comprises an essentially annular-shaped bottom portion (8), consisting of two annular plates (9, 10), the first on top of the second and extending outwards radially from respective annular flanges (11, 12) on sleeve 4, and a top portion (13), consisting of a star-shaped plate comprising a center portion (14), connected to plate 9 and flange 11 by through bolts 15, and a number of flexible radial arms (16) evenly arranged round hub 14 and equal in number to the number of blades (17) on hub 5.

As shown, particularly in FIGS. 1 and 3, each arm (16) on plate 13, made of composite material, has an essentially rectangular longitudinal section with a through aperture (18) near its free end, the said aperture having its axis essentially parallel to that of shaft 2 and being essentially rectangular in shape with its larger longitudinal axis perpendicular to the longitudinal axis of the relative arm 16.

Through each aperture (18) is mounted a casing (19) with a peripheral flange (20) on top fitted to the top surface of the relative arm 16. The said casing forms an outer shoe for elastomer ball support 21 comprising two essentially ball-shaped inner caps (22) arranged side by said and connected to outer shoe 19 with a layer (23) of elastomer material inbetween.

Caps 22 are fitted through diametrically with respective bolts 24 which are essentially parallel to shaft 2 and fitted on the bottom end with the flange (25) of a hollow bracket (26) essentially C-shaped in section with its concave side facing shaft 2. On the side facing shaft 2, each bracket (26) is closed by a plate (27) arranged essentially perpendicular to the relative arm 16 and secured on to the relative bracket (26) by means of screws 28.

The channel defined by each plate 27 inside the relative bracket (26) is engaged by the middle center portion of a respective side (29) on annular component or polygonal ring 30 extending round hub 6 and having the same number of sides as the number of arms 16. Each side 29 consists, at least in the center portion, of four strips (31) of composite material divided into one pair of top strips and one pair of bottom strips separated by a layer of filler material (32) disappearing next to the tips of polygonal ring 30. In each of the said pairs, strips 31 are arranged side by side in the same plane essentially perpendicular to the axis of shaft 2 and are pressed against strips 31 in the other pair by an outer casing (33).

At each tip of ring 30, a metal tubular element (34) is inserted between the two inner and outer strips (31) the axis of the said tubular element being essentially parallel to that of shaft 2 and coinciding with that of two through holes (35) on respective arms 36 and 37 extending essentially radially in relation to shaft 2, the first over and the second under ring 30. Arms 36 and 37 are the arms of a fork (38) for connecting a blade (17). In more detail, each fork 38 comprises a tubular truncated-cone rod (39) from the small end of which a cylindrical element (40) extends axially and terminates close to shaft 2 in a threaded section (41) engaged by ring nut 42, and from the large end of which a flange (43) extends radially outwards with the two arms (36, 37) extending outwards from it. The free ends of the said arms are connected together by pins 44 connecting the foot of blade 17 to fork 38.

The outer surface of flange 43 on each fork 38 is mated with the inner surface of an annular piece connecting a pitch regulating lever (45) the free end of which is connected to control links not shown in the diagram. As shown in FIG. 2, the cylindrical element (40) on each fork 38 extends inside the space between plates 9 and 10 to which it is connected by means of an elastomer support (46) comprising an annular outer casting (47), coaxial with cylindrical element 40, a cylindrical inner shoe (48), assembled contacting cylindrical element 40, and an intermediate shoe (49), mounted between the inner shoe (48) and outer casing (47) and separated from them respectively by a first and second annular layer (50,51) of elastomer coaxial with element 40. Layer 50 is essentially trapezoidal in section whereas layer 51 is confined both internally and externally by spherical surfaces. Casing 47 is provided externally with said pieces (not shown) for connecting the casing (47) to plates 9 and 10 with a further two annular elastomer supports inbetween, the first of which (52) is connected integral with top plate 9, and the second (53) to bottom plate 10. Supports 52 and 53, which are coaxial with each other and essentially parallel to the axis of shaft 2, each comprise an annular outer shoe (54), connected integral with respective plate 9 and 10, and an annular inner shoe (55) connected to the said pieces (not shown) on casing 47 and separated from the respective outer shoe (54) by an annular layer (56) of elastomer.

Each fork 38 is also connected to ring 30 with a radial elastomer support (57) inbetween, the said support being mounted between arms 36 and 37 between ring 30 and flange 43 and comprising an inner shoe (58), confined externally by a spherical-cap-shaped surface, an essentially turncated-cone outer shoe (59) and an intermediate shoe (60) connected respectively to shoes 58 and 59 by a spherical-cap-shaped elastomer layer (61) and a truncated-cone elastomer layer (62).

Shoe 59 is connected externally, by screws 63, to the flange (64) of a bracket (65) essentially U-shaped in section and fitted radially contacting the outer surface of casing 33 of ring 30 with which it is made integral by means of screws 66.

On the rotor described, centrifugal strain is transmitted by blade 17 to ring 30 which provides for two advantages. Firstly, strain is distributed throughout the entire rotor structure, thus preventing the formation of major stress areas, and, secondly, arms 16 are not noticeably affected. The latter, in fact, are only essentially affected, via ring 30, by the moments generated by the blades which, even in the event of relatively poor elasticity on arms 16, are generally withstandable on account of their being dampened by the elasticity of ring 30 and on account of the short length of arms 16 which extend along the axes of the polygon defined by ring 30 and not along its diagonals.

We claim:

1. Helicopter rotor comprising a center hub (5), designed to fit on to a center drive shaft (2), a number of blades (17) extending outwards from the said hub (5), each said blade (17) being connected to the said hub (5) by connecting means designed to enable the blade (17) to oscillate in the plane parallel to the said drive shaft (2), in the plane perpendicular to the said drive shaft (2), as well as around its own axis; the said connecting means comprising, for each blade (17), a fork (38) extending outwards essentially radially from the said hub (5) and connected to it by first elastomer supporting means (46); the said fork (38) having two arms (36, 37) facing outwards and connected to the connecting end of the relative blade (17); characterised by the fact that the said connecting means also comprise an annular component (30) extending round the said hub (5) and through the said forks (38) and connected to each of the latter by second elastomer supporting means (57); the said hub (5) comprising an essentially star-shaped plate (13) with a number of radial arms (16) and connecting means (21) being mounted between each said arm (16) and a respective point on the said annular component (30) lying halfway between two adjacent said second elastomer supporting means (57).

2. Rotor according to claim 1, characterised by the fact that the said annular component (30) is essentially polygonal in shape; each said second elastomer supporting means (57) being arranged at the tip of the said polygon and each said connecting means (21) engaging with a point on the said polygon essentially equidistant from two of the said tips.

3. Rotor according to claim 1, characterised by the fact that each connecting means comprises a hollow bracket (26), fitted through with the said annular component (30), and an elastomer support (21) connecting the said bracket (26) to one end of one of the said arms (16).

4. Rotor according to claim 1, characterised by the fact that the said annular component consists of a ring (30) made of composite material.

5. Rotor according to claim 4, characterised by the fact that the said ring (30) comprises a number of strips (31) arranged side by side.

* * * * *